United States Patent [19]

Jens et al.

[11] Patent Number: 5,286,154
[45] Date of Patent: * Feb. 15, 1994

[54] IN BUNDLE FOREIGN OBJECT SEARCH AND RETRIEVAL APPARATUS

[75] Inventors: Stephen C. Jens, Ashland; Michael W. Osborne, Waltham; Paul F. Viola, Sommerville; Christos Athanassiu, Winchester; Robert A. S. Lee, Stoneham, all of Mass.

[73] Assignee: Electric Power Research Institute, Inc., Palo Alto, Calif.

[*] Notice: The portion of the term of this patent subsequent to Aug. 6, 2008 has been disclaimed.

[21] Appl. No.: 661,825

[22] Filed: Feb. 27, 1991

Related U.S. Application Data

[63] Continuation-in-part of Ser. No. 314,091, Feb. 22, 1989, Pat. No. 5,036,871, and a continuation-in-part of Ser. No. 303,268, Jan. 27, 1989, Pat. No. 5,065,703, which is a continuation-in-part of Ser. No. 27,810, Mar. 18, 1987, Pat. No. 4,827,953.

[51] Int. Cl.$^5$ ............................................. B25J 3/00
[52] U.S. Cl. ........................................... 414/7; 901/21; 901/28; 901/36; 294/100
[58] Field of Search ................. 414/7, 8, 1, 3; 294/66.2, 100, 19.1; 15/104.32, 104.33; 165/11.1; 901/21, 27, 28, 29, 36

[56] References Cited

U.S. PATENT DOCUMENTS

| | | | |
|---|---|---|---|
| 2,355,086 | 8/1944 | Lang | 294/66.2 |
| 2,595,134 | 4/1952 | Gordon | 294/100 |
| 3,497,083 | 2/1970 | Anderson et al. | 901/36 X |
| 4,196,049 | 4/1980 | Burns et al. | |
| 4,344,146 | 8/1982 | Davis, Jr. et al. | |
| 4,445,185 | 4/1984 | Davis, Jr. et al. | |
| 4,604,715 | 8/1986 | Toutant et al. | |
| 4,638,667 | 1/1987 | Zimmer et al. | 165/11.1 X |
| 4,673,027 | 6/1987 | Vermaat | |
| 4,706,120 | 11/1987 | Slaughter et al. | |
| 4,757,258 | 6/1988 | Kelly, Jr. et al. | |
| 4,804,038 | 2/1989 | Klahn et al. | |
| 4,812,666 | 3/1989 | Wistrand | |
| 4,822,238 | 4/1989 | Kwech | |
| 4,919,194 | 4/1990 | Gery et al. | |
| 4,924,933 | 5/1990 | Richter et al. | |
| 4,928,546 | 5/1990 | Walters | 901/21 X |
| 5,036,871 | 8/1991 | Ruggieri et al. | 134/167 R |

FOREIGN PATENT DOCUMENTS 202642  3/1966  Sweden .................................. 414/1

Primary Examiner—David A. Bucci
Assistant Examiner—Donald W. Underwood
Attorney, Agent, or Firm—Flehr, Hohbach, Test, Albritton & Herbert

[57] ABSTRACT

An apparatus (10) for the location and removal of foreign objects from a difficult to access geometry utilizes a flexible lance (12) formed of individual hose bar segments (14) strung on cables (16) to give a structure that is flexible along its length and fairly rigid in a direction transverse to its length. Extending from working channels (18) of nozzle block (20) of the lance (12) are a pair of multi-prong retrievers (22). A miniaturized Videoprobe camera (24) is provided in the nozzle block (20) between the two retrievers (22). The retrievers are each connected to an actuating cable (26), which extends through the flexible lance (12) to a manual control (28). The camera (24) is connected by a cable (30) to suitable video processing circuits for generation of images on a video display (32). The cable (30) also houses a fiber optic bundle which conveys light to the area being serviced by the lance (12). The flexible lance (12) extends through a transporter (34), which positions the nozzle block end of the lance (12) opposite a portion of a steam generator or other difficult to access geometry. The transporter (34) moves along a transport rail (36) to move the nozzle block end of the lance (12) into position. The lance (12) is then advanced through the transporter (34) to move the nozzle block end into the difficult to access geometry and retracted to withdraw the nozzle block end from the difficult to access geometry.

23 Claims, 6 Drawing Sheets

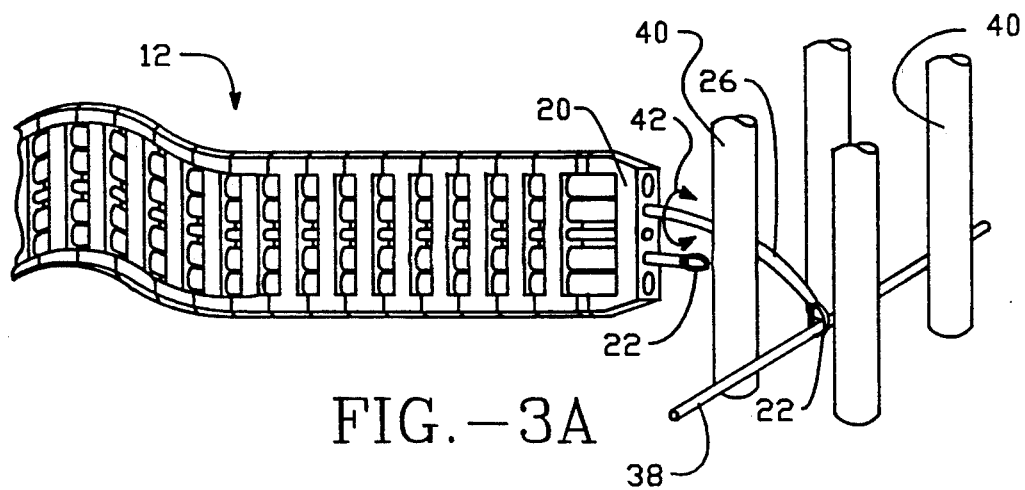
FIG.—3A
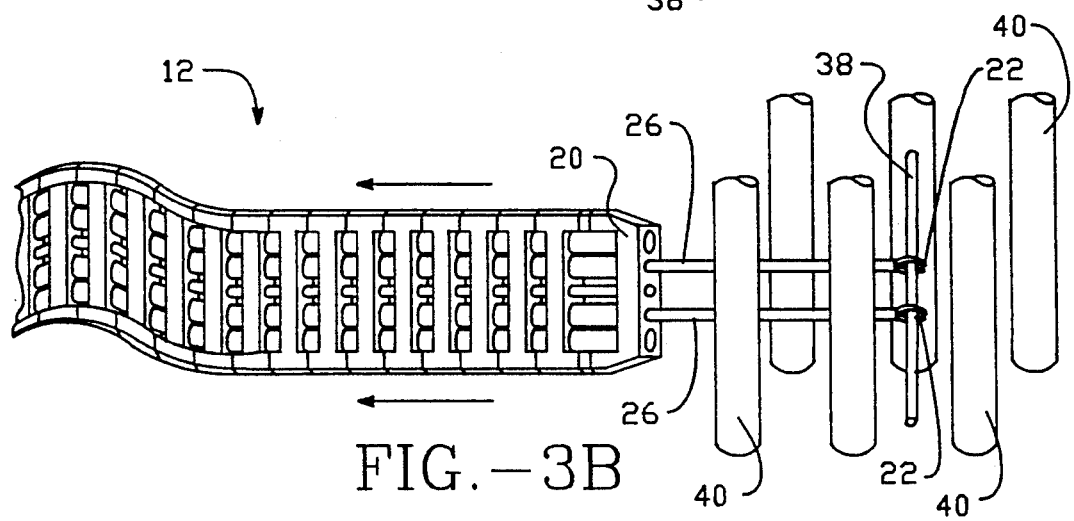
FIG.—3B
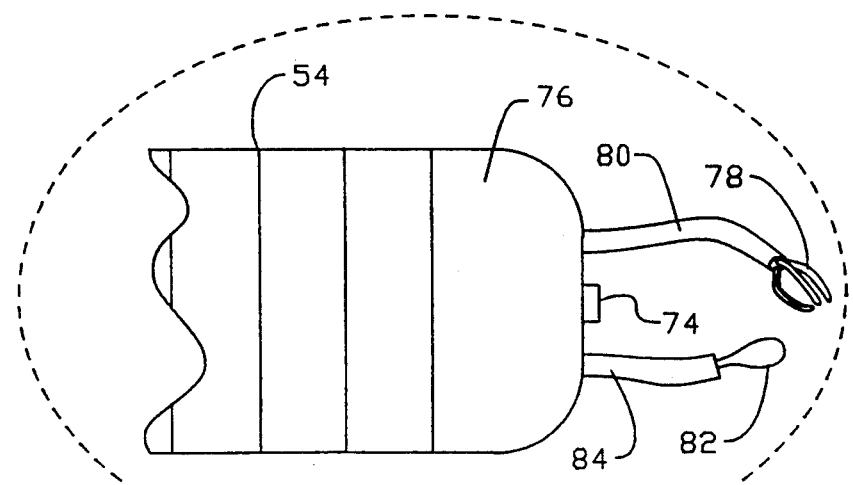
FIG.—4A

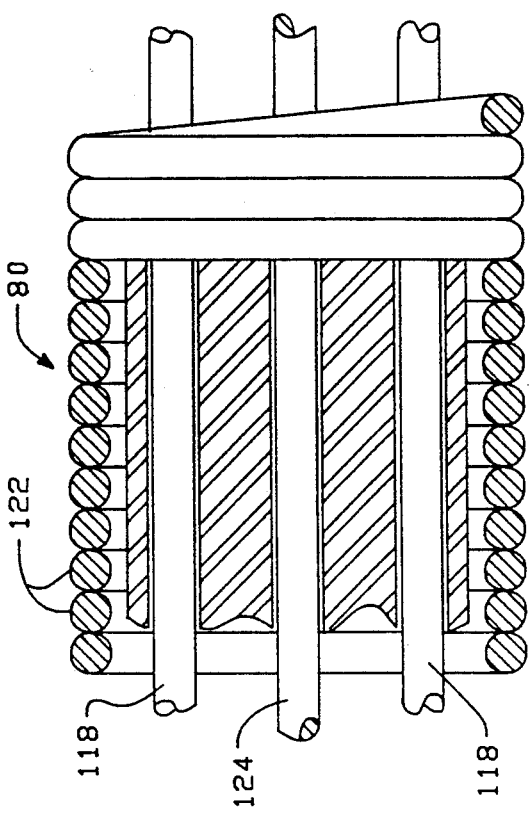
FIG.—7A
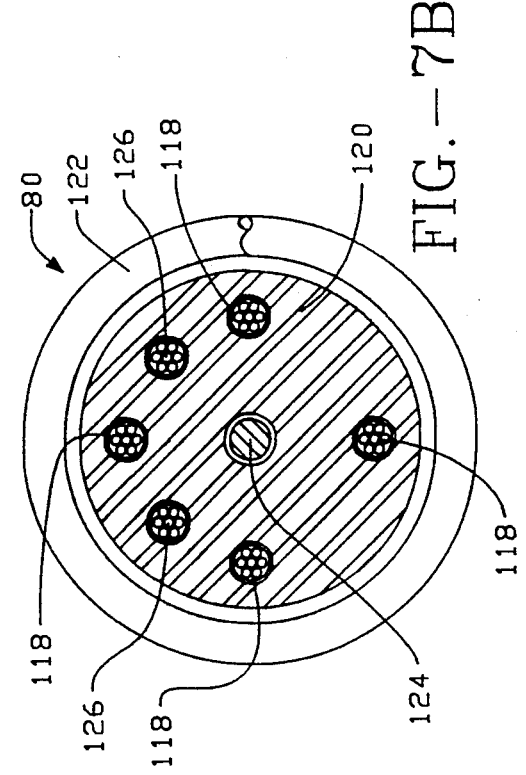
FIG.—7B
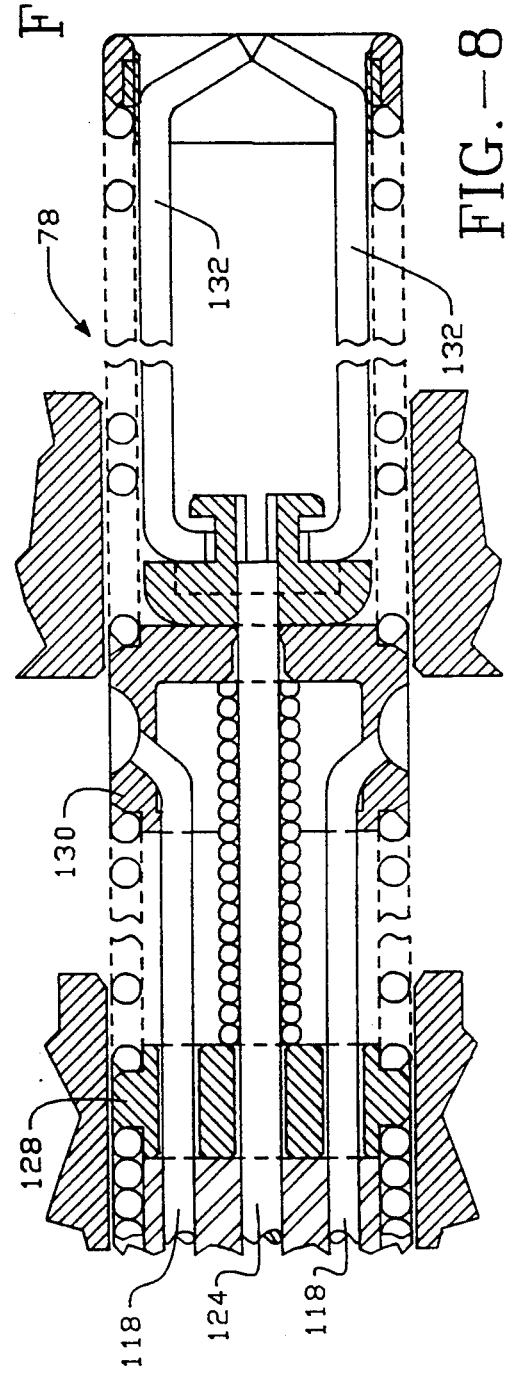
FIG.—8

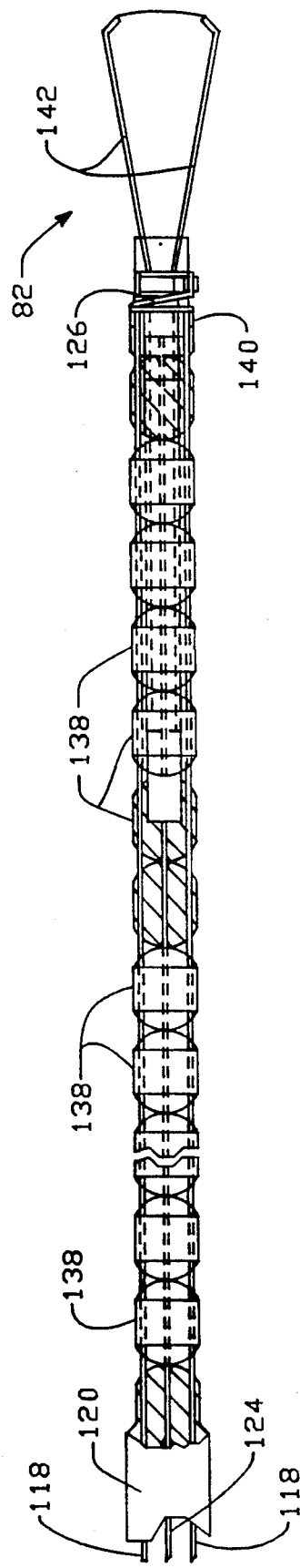
FIG.—9

IN BUNDLE FOREIGN OBJECT SEARCH AND RETRIEVAL APPARATUS

CROSS-REFERENCE TO RELATED APPLICATIONS

This application is a continuation-in-part of commonly assigned application Ser. No. 07/303,268, filed Jan. 27, 1989, in the name of Robert A. S. Lee, now U.S. Pat. No. 5,065,703, which is in turn a continuation-in-part of commonly assigned application Ser. No. 07/027,810, filed Mar. 18, 1987, in the name of Robert A. S. Lee, now U.S. Pat. No. 4,827,953, both entitled "Flexible Lance for Steam Generator Secondary Side Sludge Removal." This application is further a continuation-in-part of commonly assigned application Ser. No. 07/314,091, filed Feb. 22, 1989, in the names of Steven K. Ruggieri, Stephen C. Jens and Robert Sykes, now U.S. Pat. No. 5,036,871, and entitled "Flexible Lance and Drive System."

BACKGROUND OF THE INVENTION

1. Field of the Invention

The present invention relates generally to a robotic system that is useful in nuclear power plants and other structures with a difficult to access geometry. More particularly, it relates to such a system which is capable of locating and removing foreign objects that have been accidentally introduced into such structures with a difficult to access geometry, such as in the tube bundles of a nuclear power plant s steam generators.

2. Description of the Prior Art

Nuclear power generation equipment consists of two major parts, the reactor and the steam generator. The steam generator includes a heat exchanger, which, in simple terms, consists of a bundle of thin wall tubes, which are tightly spaced and arranged in a matrix-like fashion. The spacing between the tubes is less than 0.5 inches, and the tube height extends to several feet. Hot reactor coolant is pumped through the tubes, which in turn heats water under pressure above the boiling point to several hundred degrees, thus generating steam.

During reactor shut down for refueling or any other reason, repair and maintenance technicians enter various areas, one of which is the steam generator housing. During such entry, accidental dropping of such items as welding rods, washers, screws and the like is possible. Such items can cause damage to the thin wall tubes if they are not retrieved. Repairing, replacing or plugging such damaged tubes is very expensive, both in terms of the labor involved and required reactor shut down. To date, it has not been possible to retrieve such items, due to the physical constraints of the steam generator geometry and the presence of radiation.

U.S. Pat. No. 4,638,667, issued Jan. 27, 1987 to Zimmer et al. discloses a remote probe positioning apparatus including a flexible tape which has an optical fiber cable running the length of the tape and a retractor tool at a distal end of the tape. However, no details are given on the construction and operation of the retractor tool. Further development is therefore required in order to provide a system for removing foreign objects which will meet the needs of nuclear power plant steam generator geometry and similar difficult to access geometries.

SUMMARY OF THE INVENTION

Accordingly, it is an object of this invention to provide a system for finding and retrieving foreign objects in a difficult to access geometry, such as the in bundle area of a nuclear power plant steam generator.

It is another object of the invention to provide such a system for finding and retrieving foreign objects in which operation of the system is controlled remotely.

It is a further object of the invention to provide such a system in which remote controls for the system and method are configured to provide precise control inside the difficult to access geometry.

The attainment of these and related objects may be achieved through use of the novel foreign object search and retrieval apparatus herein disclosed. A foreign object search and retrieval apparatus in accordance with this invention has a flexible member with a distal end. An optical cable extends lengthwise along and within the flexible member. A video cable and a video camera connected to the video cable at the distal end of the flexible member forms an image of a scene visible from the distal end of the flexible member for transmission by the video cable. A retractor tool is mounted at the distal end of the flexible member. At least one actuating cable for the retractor tool extends lengthwise along and within the flexible member. The flexible member is configured to be driven into the difficult to access geometry. A positioning handle is connected to the at least one actuating cable for the retractor tool. In one form of the invention, the positioning handle includes a joystick mechanism and the at least one actuating cable for the retractor tool includes a plurality of flexible steering cables connected to the joystick mechanism and to the retractor tool.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIGS. 3A and 3B are perspective views of a further portion of the apparatus shown in FIGS. 1 and 2 in use.

FIG. 4A is an enlarged side view of a portion of the apparatus of FIG. 4

FIGS. 7A and 7B are cross-section and end views, respectively, of a portion of the apparatus of FIGS. 4-5.

FIG. 8 is a cross-section view of another portion of the apparatus of FIGS. 4-7B.

FIG. 9 is a side view of another portion of the apparatus of FIGS. 4-7B.

DETAILED DESCRIPTION OF THE INVENTION

Figure 1:
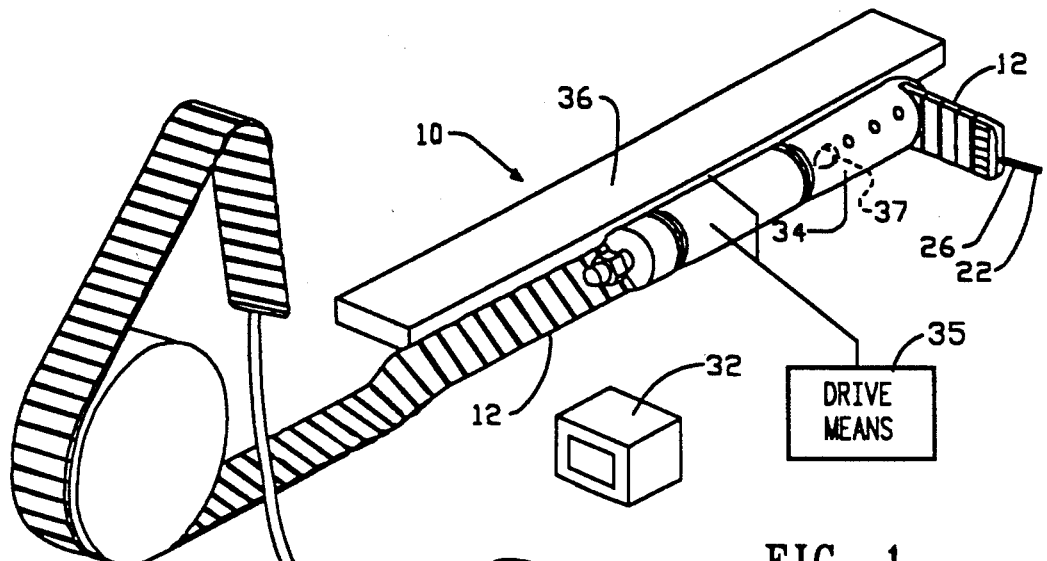
FIG. 1 is a perspective view of a foreign object search and retrieval apparatus in accordance with the invention.
Figure 2:
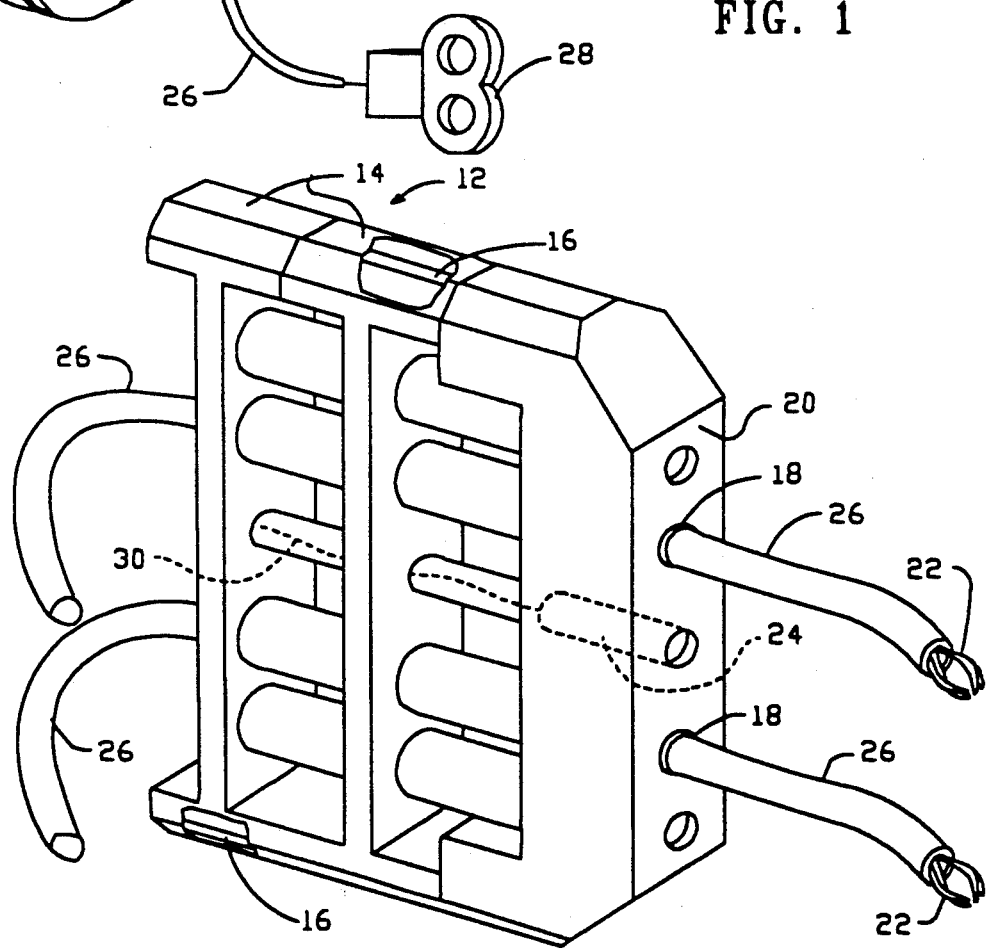
FIG. 2 is a perspective view of a portion of the apparatus shown in FIG. 1.

Turning now to the drawings, more particularly to FIG. 1 and 2, there is shown an apparatus 10 for the location and removal of foreign objects from a difficult to access geometry. The apparatus 10 utilizes a flexible lance 12 formed of individual hose bar segments 14 strung on cables 16 to give a structure that is flexible along its length and fairly rigid in a direction transverse to its length. Further details on the construction of the lance 12 are provided in the above referenced copending Ruggieri et al. application, the disclosure of which is hereby incorporated by reference herein. Extending from working channels 18 of nozzle block 20 of the lance 12 are a pair of multi-prong retrievers 22. A miniaturized Videoprobe camera 24 is provided in the nozzle block 20 between the two retrievers 22. The retrievers are each connected to an actuating cable 26, which extends through the flexible lance 12 to a manual control 28. The camera 24 is connected by a cable 30 to suitable video processing circuits (not shown) for generation of images on a video display 32. The cable 30 also houses a fiber optic bundle which conveys light to the area being serviced by the lance 12. The flexible lance 12 extends through a transporter 34, which positions the nozzle block end of the lance 12 opposite a portion of a steam generator or other difficult to access geometry. The transporter 34 is driven by a suitable drive means 35, such as a rack and gear drive, along a transport rail 36 to move the nozzle block end of the lance 12 into position. The lance 12 is then advanced through the transporter 34 by means of a sprocket drive 37 that has teeth which fit between the hosebar segments 14 to move the nozzle block end into the difficult to access geometry and retracted to withdraw the nozzle block end from the difficult to access geometry.

FIGS. 3A and 3B show how the retrievers 22 are operated to retrieve a foreign object, such as a welding rod 38, after the nozzle block 20 end of the flexible lance 12 is positioned as desired in tubes 40 of the steam generator. The actuating cable 26 of one of the retrievers 22 is extended from the nozzle block 20, so that its retriever 22 is able to grasp the welding rod 38. The actuating cable 26 is then rotated, as indicated by arrow 42, to upend the welding rod 38 to the position shown in FIG. 3B. The other actuating cable 26 is then extended, so that the other retriever 22 grasps the welding rod 38. The flexible lance 12 is then withdrawn from the tube 40 bundle, as indicated by arrows 44, thus removing the welding rod 38.

Figure 4:
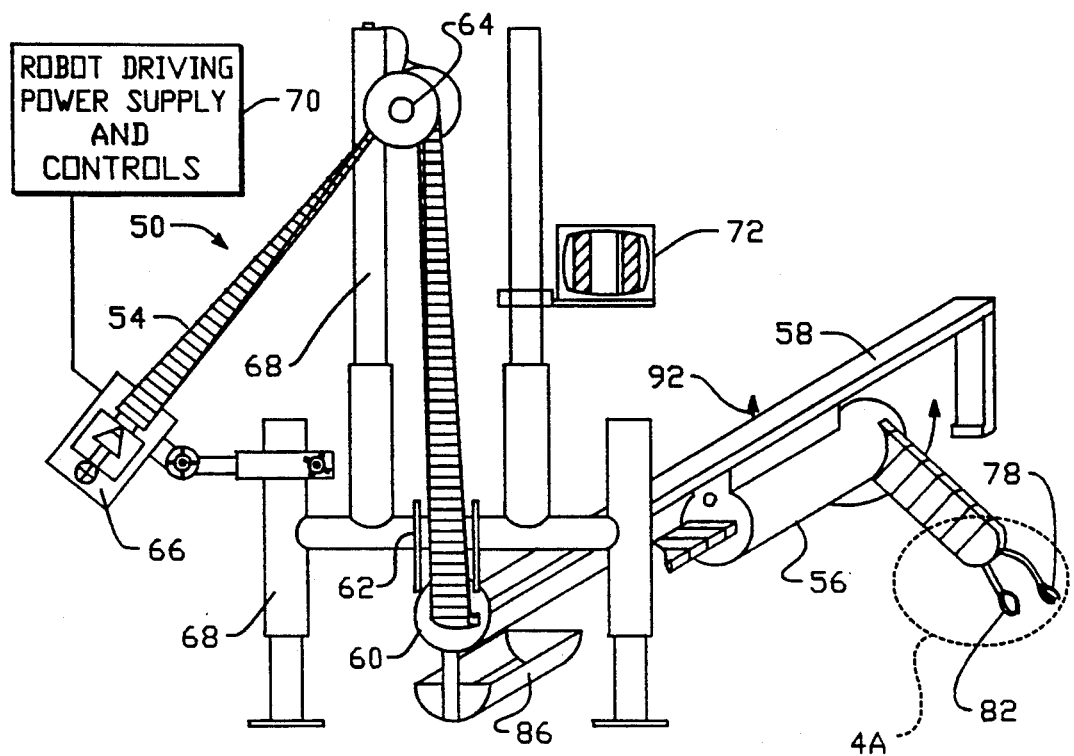
FIG. 4 is in part a perspective view and in part a block diagram of another embodiment of a foreign object search and retrieval apparatus in accordance with the invention.
Figure 5:
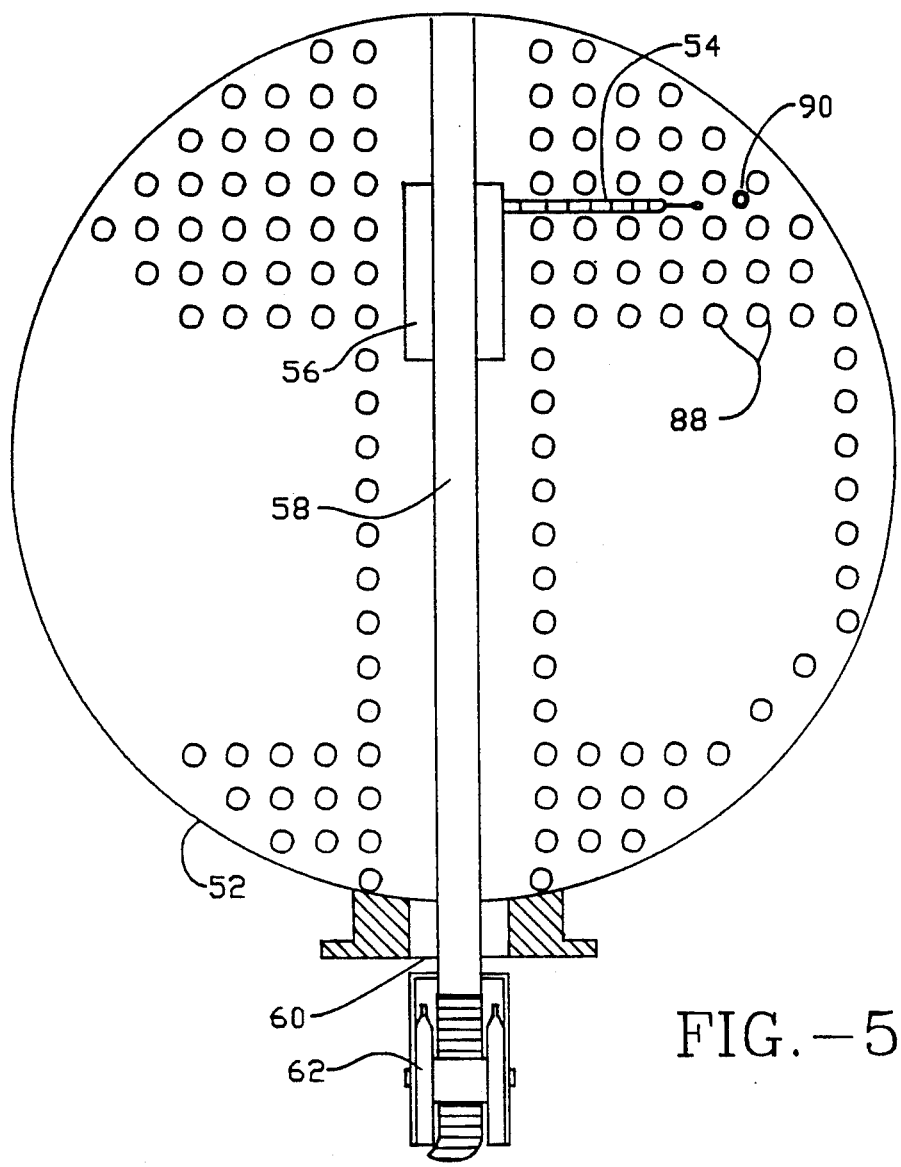
FIG. 5 is a plan view of the apparatus of FIGS. 4 and 4A in use.

FIGS. 4 and 5 show another system 50 for the location and removal of foreign objects from a difficult to access geometry, i.e., steam generator 52. In the system 50, a flexible lance 54 having the same construction as the flexible lance 12 extends through a robot cylinder 56, which is mounted for movement along track 58. The flexible lance 54 extends through hand hole 60, around a reel 62 and a take-up reel 64 to manipulator handles 66. The reels 62 and 64 are mounted on a "goal post" support 68, positioned at the hand hole 60. Robot driving power supply and controls 70 are connected to the flexible lance 54 at the manipulator handles 66. A video monitor 72 is mounted on the support 68 and is connected to receive images from a miniaturized Videoprobe camera 74 in nozzle block 76 of the flexible lance 54. The flexible lance 54 has a multi-prong retriever 78 connected to an actuating cable 80 and another multi-prong retrieval tool 82 having a different configuration connected to an actuating cable 84. A variety of retrieval tool configurations can be employed with the flexible lance 54, depending on the nature of the foreign objects to be retrieved. A portable bucket 86 is positioned inside the steam generator 52 adjacent to the hand hole 60.

In operation of the system 50, one operator mans the robot controls 70 and another operator mans the tool manipulating handles 66. The video camera 74 provides a 90 degree viewing field. It is used by both operators to position the nozzle block 76 end of the flexible lance 54 accurately and sequentially and to retrieve objects, respectively. The robot controls 70 operator positions the robot cylinder 56 with the flexible lance 54 opposite a point between two tube 88 rows and extends the lance 54, searching for foreign objects, such as washer 90. If none are found, the lance 54 is retracted, the cylinder 56 is rotated as indicated by arrow 92, and the procedure is repeated to inspect the opposite side from the track 58.

If an object 90 is located, the operator manning the tool manipulator 66 directs the appropriate tool 78 or 82 toward the object 90 and retrieves it. The robot controls 70 operator then retracts the lance and rotates the cylinder 56 so that the nozzle block 76 faces downwards. The cylinder 56 is then retracted to a position directly above the bucket 86. The object 90 is released into the bucket 86, and the searching process continues. If desired, the above operation could be carried out with a single operator, by sequential operation of the controls 70 and tool manipulator 66. Alternatively, the tool manipulator 66 could be replaced with a system of motors and appropriate controls, so that one operator can perform the search and retrieval remotely. That embodiment would minimize the exposure of personnel to radiation.

Figure 6A:
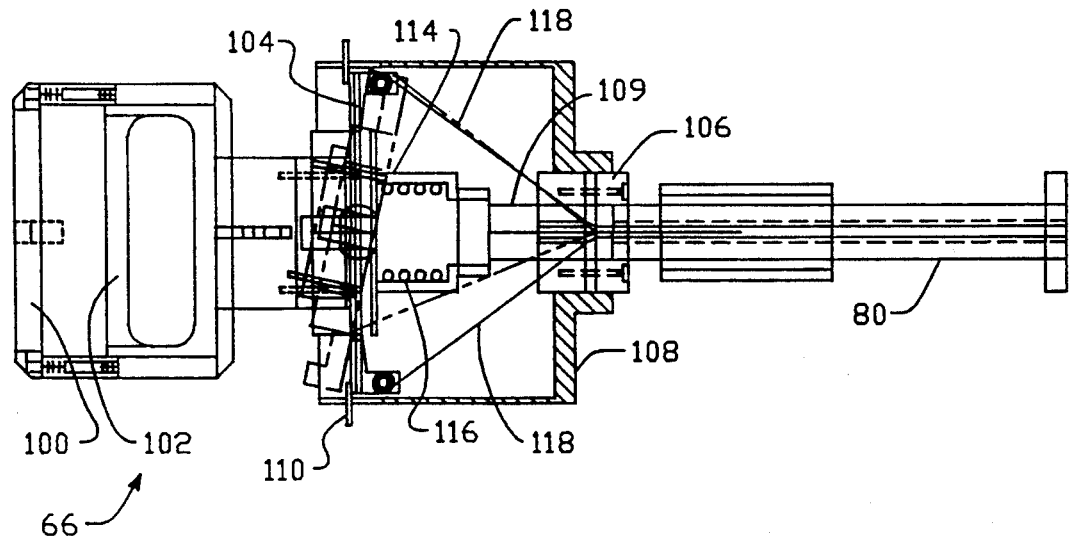
FIGS. 6A and 6B are cross-section and end views, respectively, of a user control for the apparatus of FIGS. 4-5.
Figure 6B:
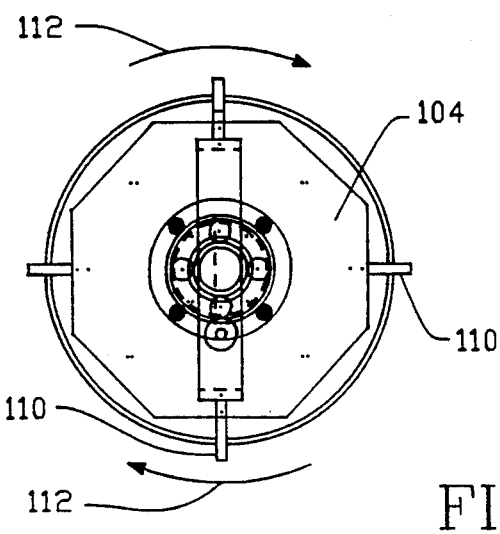

FIGS. 6A and 6B show details of the manipulator handles 66. A separate manipulator handle 66 is connected to each of the retrieval tools 78 and 82. The manipulator handle 66 will be explained with respect to the multi-prong retriever 78, it being understood that the manipulator handle 66 functions in a similar manner with the retrieval tool 82 and other retrieval tools. The manipulator handle 66 has a first handle portion 100 and a second handle portion 102 slideably mounted in the first handle portion 100. The manipulator handle 66 is fixedly attached to a base plate assembly 104. The base plate assembly is in turn attached to a rigid joint 106 on cover cage 108 by shaft 109. The cover cage 108 engages projections 110 on the base plate assembly 104 to prevent rotation of the base plate assembly 104 when the manipulator handle 66 is rotated in use. In addition to the rotation of the manipulator handle 66 as indicated by arrows 112, the manipulator handle 66 is movable in a joystick fashion, as indicated in phantom in FIG. 6A. A joystick motion limiter 114 is attached to the shaft 109 and is connected to the baseplate assembly 104 by a center compression spring 116. Four steering cables 118 (two of which are shown in FIG. 6A) are connected to the top, bottom, right and left sides of the base plate assembly 104.

The steering cables 118 extend through actuating cable 80 and are connected to the multi-prong gripper 78. When the actuating cable 80 is extended from the nozzle block 76 (FIG. 4A), joystick movement of the manipulator handle 66 pulls on one or more of the steering cables to move the extending end of the actuating cable 80 up, down, to the left or to the right to position the gripper 78. When the handle 66 is positioned as shown in phantom in FIG. 6A for example, the base plate assembly 104 pulls on the bottom steering cable 118, steering the gripper 78 downward.

Details of the actuating cable 80 and the gripper 78 are shown in FIGS. 7A, 7B and 8. The actuating cable 80 consists of a multi-lumen flexible plastic extrusion 120 encased in a spring like jacket 122. The steering cables 118 extend lengthwise along the extrusion 120 and are free to move within it. Also extending lengthwise along the extrusion 120 are a spring tempered tool operating wire 124 and a pair of tool rotating cables 126. The steering cables 118 extend through a metal interface 128 and are attached to housing 130 of the gripper 78. It can be seen that pulling on the upper steering cable 118 will bend the gripper 78 upward, and pulling on the lower steering cable 118 will bend the gripper 78 downward. Left and right steering cables 118 operate in a similar manner. The tool operating wire 124 also extends through the interface 128 and is attached to prongs 132 of the gripper 78. The prongs 132 are normally closed and retracted within the housing 130. Pushing on the tool operating wire 124 causes the prongs 132 to extend beyond the housing 130 and open. The prongs 132 are then closed around a foreign object by pulling on the tool operating wire 124, moving the prongs partially back into the housing 130 to close them. The tool rotating cables 126 are also free to move within the actuating cable 80 and are connected to the multi-prong retriever 78 for rotating it clockwise and counterclockwise by pulling on the cables 126.

FIG. 9 shows details of the retrieval tool 82, including how it is connected to tool rotating cables 126. As shown, the tool rotating cable 126 extends partially around the retrieval tool 82, so that pulling on the tool rotating cable 126 shown causes the retrieval tool to rotate clockwise. Another tool rotating cable 126 is connected to the opposite side of the retrieval tool 82, and pulling on that tool rotating cable 126 causes the retrieval tool 82 to rotate counter-clockwise. Also shown is how steering cables 118 pass through a string of aluminum or plastic beads 138 extending from the extrusion 120 and are anchored at housing 140 of the retrieval tool. Pulling on the upper steering cable 118 forces the beads 138 upwards to raise the retrieval tool 82. Pulling on the lower steering cable 118 forces the beads 138 downwards to lower the retrieval tool 82. Left and right steering cables operate in the same manner. Tool operating wire 124 is attached to grappler prongs 142 of the retrieval tool 82. Pushing or pulling on the tool operating wire 124 extends or retracts the prongs 142 from or into the housing 140 to open or close the grappler prongs 142. The grappler prongs 142 lock onto an object such as a washer or screw by forcing the prongs 142 to close as they are retracted part way into the housing 140.

It should now be readily apparent to those skilled in the art that a novel in bundle foreign object search and retrieval system and method capable of achieving the stated objects of the invention has been provided. The system and method finds and retrieves foreign objects in a difficult to access geometry, such as the in bundle area of a nuclear power plant steam generator. Operation of the system and the method is controlled remotely. The remote controls for the system and method are configured to provide precise control inside the difficult to access geometry.

It should further be apparent to those skilled in the art that various changes in form and details of the invention as shown and described may be made. It is intended that such changes be included within the spirit and scope of the claims appended hereto.

What is claimed is:

1. A system comprising, in combination, a flexible means for accessing an assembly having a difficult to access geometry, which comprises a flexible member having a distal end, an optical cable extending lengthwise along and within said flexible member for illuminating a portion of the difficult to access geometry, a video cable, a video camera connected to said video cable at the distal end of said flexible member for forming an image of a sense visible from the distal end of said flexible member for transmission by said video cable, a retractor tool mounted at the distal end of said flexible member, and at least one actuating cable for said retractor tool extending lengthwise along and within said flexible member, said flexible member having a plurality of separate, integrally formed hosebar supports, each comprising a pair of separate, longitudinally extending shapes engaging the separate shapes of adjacent hosebar supports and together defining flexible, longitudinally extending strips, and a bar joining said pair of shapes, said bar having a plurality of apertures aligned with a corresponding plurality of apertures in bars of adjacent hosebar supports, said plurality of apertures respectively receiving said optical cable, said video cable, and said actuating cable, a rigid guide extending lengthwise of said flexible member, said flexible member being movably mounted along said rigid guide, said rigid guide having an end positioned to turn said flexible member in a predetermined angle with respect to an extending direction of said flexible member as said flexible member passes from said rigid guide through said end, a drive means positioned to engage and drive said flexible member through said rigid guide, a transporter for said combination, in which said rigid guide comprises a body of said transporter, and at least one transporter drive means attached to said transporter, said flexible member comprising separate segments strung on at least one flexible cable which runs the length of the flexible member.

2. The system of claim 1 in which said retractor tool comprises a multi-prong retriever.

3. The system of claim 1 additionally comprising a positioning handle connected to said at least one actuating cable for said retractor tool.

4. The system of claim 3 in which said positioning handle includes a joystick mechanism and said at least one actuating cable for said retractor tool includes a plurality of flexible steering cables connected to said joystick mechanism and to said retractor tool.

5. The system of claim 4 in which said retractor tool comprises a multi-prong retriever and said at least one actuating cable includes a tool operating wire connected to said retractor tool to open and close the multi-prong retriever.

6. The system of claim 4 in which said at least one actuating cable for said retractor tool includes at least one retractor tool rotating cable attached to said retractor tool.

7. The system of claim 1 additionally comprising a transport rail, said transporter being mounted to said rail for movement along said transport rail.

8. The system of claim 1 additionally comprising a support member positioned proximate to an access opening to the difficult to access geometry and a take-up reel for said flexible member attached to said support member, with said flexible member extending into the difficult to access geometry through the access opening.

9. The system of claim 8 in which said retractor tool comprises a multi-prong retriever.

10. The system of claim 8 additionally comprising a positioning handle connected to said at least one actuating cable for said retractor tool.

11. The system of claim 10 in which said positioning handle includes a joystick mechanism and said at least one actuating cable for said retractor tool includes a plurality of flexible steering cables connected to said joystick mechanism and to said retractor tool.

12. The system of claim 11 in which said retractor tool comprises a multi-prong retriever and said at least one actuating cable includes a tool operating wire connected to said retractor tool to open and close the multi-prong retriever.

13. The system of claim 10 in which said at least one actuating cable for said retractor tool includes at least one retractor tool rotating cable attached to said retractor tool.

14. The system of claim 6 in which said retractor tool comprises a multi-prong retriever and said at least one actuating cable includes a tool operating wire connected to said retractor tool to open and close the multi-prong retriever.

15. The system of claim 6 additionally comprising a support member positioned proximate to an access opening to the difficult to access geometry and a take-up reel for said flexible member attached to said support member, with said flexible member extending into the difficult to access geometry through the access opening.

16. A system comprising, in combination, a flexible member for accessing a tube gap, said flexible member having a distal end, and a transport for moving said flexible means in the tube gap, said flexible means for accessing comprising a plurality of separate, integrally formed hosebar supports, each comprising a pair of separate, longitudinally extending shapes engaging the separate shapes of adjacent hosebar supports and together defining flexible, longitudinally extending strips and a bar joining said pair of shapes, said bar having a plurality of correspondingly positioned apertures with respect to said plurality of apertures in bars of the adjacent hosebar supports, a pair of flexible support members, each extending lengthwise through corresponding one of said plurality of apertures in the bars of the adjacent hosebar supports, an optical cable extending lengthwise along and within said flexible member in a corresponding one of said plurality of apertures in the bars of the adjacent hosebar supports for illuminating a portion of the difficult to access geometry, a video cable extending lengthwise along and within said flexible member in a corresponding one of said plurality of apertures in the bars of the adjacent hosebar supports, a video camera connected to said video cable at the distal end of said flexible member for forming an image of a scene visible from the distal end of said flexible member for transmission by said video cable, a retractor tool mounted at the distal end of said flexible member, and at least one actuating cable for said retractor tool extending lengthwise along and within said flexible member in a corresponding one of said plurality of apertures in the bars of the adjacent hosebar supports.

17. The system of claim 16 in which said retractor tool comprises a multi-prong retriever.

18. The system of claim 16 additionally comprising a positioning handle connected to said at least one actuating cable for said retractor tool.

19. The system of claim 18 in which said positioning handle includes a joystick mechanism and said at least one actuating cable for said retractor tool includes a plurality of flexible steering cables connected to said joystick mechanism and to said retractor tool.

20. The system of claim 19 in which said retractor tool comprises a multi-prong retriever and said at least one actuating cable includes a tool operating wire connected to said retractor tool to open and close the multi-prong retriever.

21. The system of claim 20 in which said at least one actuating cable for said retractor tool includes at least one retractor tool rotating cable attached to said retractor tool.

22. The system of claim 16 additionally comprising a transport rail, said transporter being mounted to said rail for movement along said transport rail.

23.. The system of claim 16 additionally comprising a support member positioned proximate to an access opening to the difficult to access geometry and a take-up reel for said flexible member attached to said support member, with said flexible member extending into the difficult to access geometry through the access opening.

* * * * *